Sept. 1, 1931.    F. J. DION    1,821,145
SEALING DEVICE
Filed Aug. 8, 1929    2 Sheets-Sheet 1
Fig. 1.
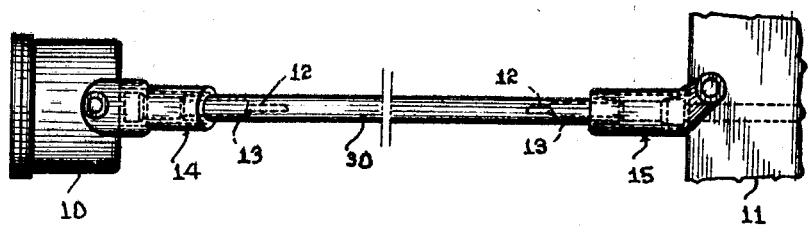
Fig. 2.
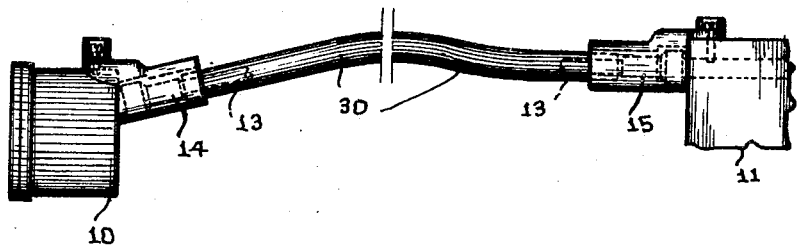
Fig. 4.
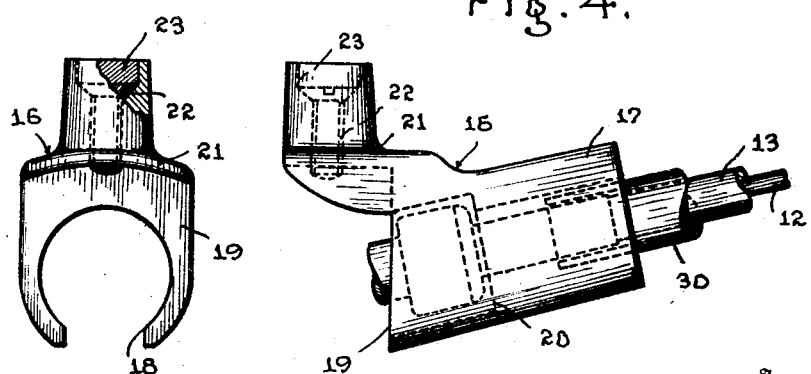
Fig. 3.
Inventor
FRANK J. DION.
By J. Richard Paris
Attorney

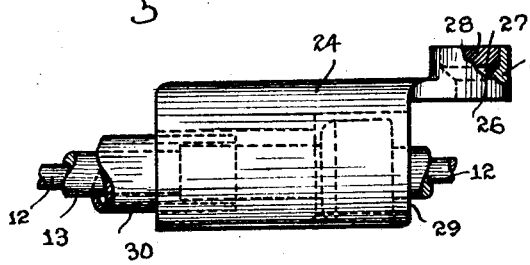
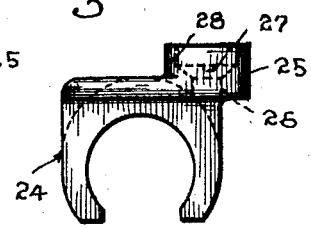
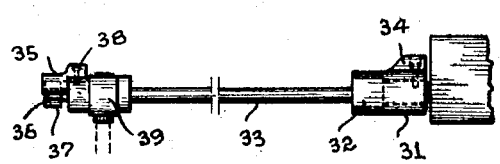
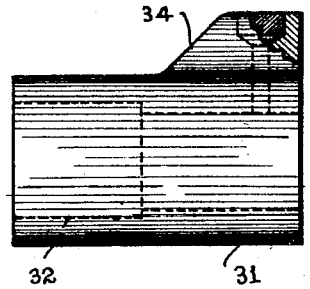
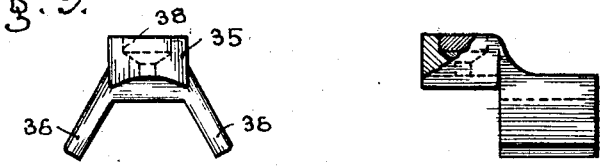

Patented Sept. 1, 1931

1,821,145

UNITED STATES PATENT OFFICE

FRANK J. DION, OF BOSTON, MASSACHUSETTS

SEALING DEVICE

Application filed August 8, 1929. Serial No. 384,439.

My invention relates to a sealing device, particularly adapted for speedometers and odometers of motor vehicles, although not limited thereto.

The device shown herein as an embodiment of my invention finds its greatest utility in motor vehicles which are hired out to the public to be driven by members of the public, the rental for the use of the vehicle being based upon the mileage traveled by the vehicle when in the custody of the customer. It is the purpose of the present invention to provide a device or devices which may be readily installed on such vehicles so as to prevent the customer from tampering with the couplings of the flexible drive shaft with the speedometer or odometer, or with the drive element of the vehicle.

While the drive shaft for the speedometer or odometer is usually housed in an armored casing, such casings are commonly of such construction that a tamperer may succeed in breaking the drive shaft within the casing without leaving any outward evidence on the casing. Another object of the present invention is, therefore, to provide said casing with a protector which will show that the shaft has been tampered with.

It is to be understood however, that the sealing devices may be used with or without such protector. When the devices are used without the protector, they may be installed with great facility without detaching any of the coupling devices.

In the accompanying drawings and the following specification, disclosure is made of one embodiment of my invention. It is understood, however, that my invention is not limited by this embodiment and that many modifications thereof that fall within the scope of the appended claims will be apparent to persons skilled in the art.

In the drawings:

Fig. 1 is a top view of one embodiment of my invention.

Fig. 2 is a side elevation thereof.

Fig. 3 is an enlarged end view of the sealing device mounted on the speedometer casing.

Fig. 4 is an enlarged lateral view of the same device.

Fig. 5 is an enlarged end view of the sealing device mounted at the drive end of the flexible shaft.

Fig. 6 is an enlarged lateral view of the same device.

Fig. 7 shows a modified form of the invention when applied to slightly different coupling devices.

Fig. 8 shows in detail the construction of one of the sealing devices.

Figs. 9 and 10 show two views of the other sealing element.

Referring to the drawings, reference character 10 is a conventional showing of a speedometer or odometer casing and reference character 11 is a conventional showing of a transmission housing or of any other part of a vehicle from which the speedometer derives its power. Reference character 12 shows the customary flexible drive shaft which serves to transmit power from 11 to the speedometer 10 and is connected at its ends in the customary manner. Reference character 13 shows the customary flexible armor casing which houses the drive shaft 12, protects the same against accidental damage and is connected to the speedometer casing and to the transmission housing by the customary coupling devices 14 and 15, respectively.

It is obvious that such coupling devices 14 and 15 are more or less easily accessible and may be readily manipulated in such a manner as to provide access to the drive shaft 12 and thereby to disconnect the speedometer from the source of power. Where vehicles are rented on a mileage basis, it becomes important to prevent any such tampering with the connections of the drive shaft either to the speedometer or to the source of power for said shaft.

The embodiment of the present invention described herein provides a pair of sealing devices, one for the speedometer end of the drive shaft and another for the power end of the drive shaft, the sealing devices being so constructed and designed that they may be installed upon any vehicle without any manipulation or dismemberment of any of the coupling devices 14 or 15, the sealing devices being so designed that when installed no access to the coupling devices may be had without the destruction of such sealing devices or without leaving obvious evidence of the tampering. For this purpose each sealing device for the speedometer end of the drive shaft consists of a single integral casting 16 and comprises a sleeve portion 17, the sleeve, however, being provided with a longitudinal opening 18 which is large enough to pass over the armor casing 13 but is too small to pass over the coupling device 14. The internal diameter of the sleeve in the speedometer end is enlarged to receive the coupling device 14 so that the sleeve substantially encircles the coupling device, the opening 18 being entirely insufficient for the manipulation of the coupling device 14. The face 19 of the sealing device 16 is adapted to abut the speedometer casing 10, so that the coupling device 14 is held within the enlarged portion of the sleeve between the speedometer casing and the shoulder 20 on the sleeve with the result that should the tamperer succeed in bringing about any appreciable rotation of the coupling device 14 by gaining access thereto through the small opening 18, the longitudinal movement of the device 14 is so limited that any detachment of the drive shaft from the speedometer is impossible without the removal of the sealing device 16. In order to prevent the removal of the sealing device 16 it is provided with a forwardly projecting portion 21, which is designed to rest on the cylindrical face of the speedometer casing and to be permanently mounted thereon by means of a screw 22, which passes through a passage in the projection 21 provided therefor, this passage being preferably provided with a large cavity 23 so that the screw when driven home rests in the bottom of the cavity and access to the screw is prevented by filling the cavity with lead or any other fusible material, the same being provided with a seal or any other impression so that any unauthorized tampering with this seal may be readily detected.

It will be seen from the above that the sealing device 16 is readily applied to the conventional coupling of the drive shaft and housing to the speedometer casing by passing the sleeve 17 over the armor casing at the point beyond the coupling 14, this operation being followed by a movement of the sealing device 16 along the casing until the face 19 thereof abuts the speedometer casing and the portion 21 thereof rests on the speedometer casing. The screw 22 is then driven home and the cavity 23 is filled with lead and properly stamped.

A similar device 24 is provided for sealing the coupling of the power end of the drive shaft to the source of power. This sealing device is constructed in substantially the same manner as the sealing device 16 with some slight modifications to facilitate the cooperation of the device 24 with the transmission housing 11. The portion 25 which rests upon the transmission housing 11 is offset with relation to the sealing device 24 and is provided with a passage 26 to receive the screw 27, this passage also being provided with a cavity 28 to be filled with lead and to have a stamp applied thereto. In this device, like in the device 16, the face 29 of the sleeve abuts the transmission housing so that the longitudinal movement of the coupling device 15 is so limited that even should a tamperer succeed in opening the coupling its operation would not be sufficient to provide access to the driving shaft.

Cases have arisen where tamperers have succeeded in breaking the drive shaft 12 by clinching or otherwise manipulating the armor casing 13 without leaving any readily apparent evidence of the operation. This is due to the resiliency of the armor casings commonly used in such installations. In order to obviate this type of tampering the present invention contemplates an additional tubular protector housing 30 which is to pass over the armor casing 13. This protector 30 is preferably made of annealed steel ribbon or of soft annealed tubing. The protector 30 constructed in this manner prevents any successful tampering with the drive shaft at points between the couplings without leaving readily observable evidence of such tampering.

It is apparent from the above that my invention as embodied in the sealing device 16 or 24 may be used with or without the protector 30 as desired. The sealing devices 16 and 24 are effective for preventing any successful manipulation of the coupling devices and therefore prevents any disconnection of the drive shaft from the speedometer or from the source of power. It is only when additional protection against the deliberate rupture of the drive shaft is desired that the protector 30 is utilized in combination with the sealing devices 16 and 24.

Fig. 7 shows the invention as applied to a speedometer or odometer which is provided with a somewhat different coupling element. In this construction the sealing element 31 comprises a sleeve having its bore enlarged at one end as shown at 32 to completely enclose the coupling element associated with the flexible shaft or shaft housing 33. The small portion of the bore is adapted to inclose the knuckle that projects from the speedometer or other instrument. The sleeve 31 is preferably provided with an enlarged portion 34 which carries a counterbore passage to receive a screw for firmly and permanently mounting the sleeve or sealing element 31 on the speedometer. As in the other modification, the counter-bore is filled with lead and stamped.

The sealing element 35 disposed at the transmission end of the shaft is provided with an angular portion 36, which is adapted to fit snugly over the element 37 and thereby prevent its rotation. The sealing element 35 is also provided with a projecting portion 38 which is provided with the counter-bored passage for receiving a screw for firmly and permanently mounting the element 35 in relation to the fixed portion 39 of the structure disposed at the transmitting end of the shaft.

Having described my invention I do not wish to be limited to the specific embodiment shown herein, the scope of my invention being defined in the following claims.

I claim:

1. The combination of a drive shaft, an operative device, coupling means for holding said shaft and device in operative relation, and a protective means to prevent manipulation of said coupling means by unauthorized persons, said protective means consisting of an integral body having one part permanently attached to said operative device and another part engaging said coupling to prevent manipulation thereof.

2. The combination of, an encased drive shaft, a device operatively attached to said drive shaft, a coupling for attaching said shaft to said device and a protective housing mounted on and abutting said device and having a recess in its abutting face to form with said device a substantially closed chamber for said coupling.

3. An odometer, an odometer shaft housing, and a coupling for said housing, in combination with a protective device to prevent manipulation of said coupling comprising a body having a longitudinal passage to embrace said housing, said passage being enlarged at one end thereof to embrace said coupling, said body having a lateral opening permitting the passage of the shaft housing, said body also having a portion permanently mounted on said odometer.

4. In an assembly comprising an encased drive shaft, an encased mechanism operatively attached to said drive shaft and a coupling operatively attaching said encased drive shaft to said mechanism; the combination of a protective device to prevent manipulation of said coupling by unauthorized persons comprising an open ended housing having a longitudinal passage therethrough receiving one end of said encased drive shaft, said housing also having a relatively large longitudinal passage receiving said coupling, said device beng mounted with its open end facing the mechanism and means fastening said housing to the casing of the mechanism to prevent separation of said housing from said mechanism.

In testimony whereof I have affixed my signature to this specification.

FRANK J. DION.